(12) United States Patent
Sasaki et al.

(10) Patent No.: US 8,895,663 B2
(45) Date of Patent: *Nov. 25, 2014

(54) POLYCARBONATE RESIN COMPOSITION AND MOLDED ARTICLE THEREOF

(71) Applicant: Mitsubishi Chemical Corporation, Chiyoda-ku (JP)

(72) Inventors: Haruo Sasaki, Fukuoka (JP); Tomohiko Tanaka, Fukuoka (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,883

(22) Filed: Sep. 30, 2013

(65) Prior Publication Data

US 2014/0031494 A1 Jan. 30, 2014

Related U.S. Application Data

(63) Continuation of application No. PCT/JP2012/050494, filed on Jan. 12, 2012.

(30) Foreign Application Priority Data

Mar. 31, 2011 (JP) .................................. 2011-079415

(51) Int. Cl.
| | |
|---|---|
| *C08G 63/48* | (2006.01) |
| *C08L 51/06* | (2006.01) |
| *C08L 51/04* | (2006.01) |
| *C08L 69/00* | (2006.01) |
| *C08G 63/91* | (2006.01) |

(52) U.S. Cl.
CPC ................ *C08L 69/00* (2013.01); *C08L 51/06* (2013.01); *C08L 51/04* (2013.01)
USPC .............................. 525/67; 528/370; 528/371

(58) Field of Classification Search
USPC ............................................ 528/67, 370, 371
See application file for complete search history.

(56) References Cited

U.S. PATENT DOCUMENTS

| | | | |
|---|---|---|---|
| 5,416,148 | A | 5/1995 | Farah et al. |
| 7,022,768 | B1 | 4/2006 | Lacroix et al. |
| 8,481,625 | B2 | 7/2013 | Yokogi et al. |
| 2009/0143513 | A1 | 6/2009 | Rogunova |
| 2010/0160563 | A1 | 6/2010 | Miyake et al. |
| 2010/0179286 | A1 | 7/2010 | Oda et al. |
| 2012/0232198 | A1 | 9/2012 | Sasaki |
| 2012/0238679 | A1 | 9/2012 | Sasaki |
| 2012/0245264 | A1 | 9/2012 | Sasaki |
| 2012/0245265 | A1 | 9/2012 | Sasaki |
| 2013/0012628 | A1 | 1/2013 | Sasaki |
| 2013/0131271 | A1 | 5/2013 | Yokogi et al. |

FOREIGN PATENT DOCUMENTS

| | | |
|---|---|---|
| CN | 1160414 A | 9/1997 |
| CN | 1399663 A | 2/2003 |
| CN | 101675110 A | 3/2010 |
| CN | 102317374 A | 11/2012 |
| CN | 103003361 A | 3/2013 |
| EP | 2149589 A1 | 2/2010 |
| GB | 1079686 | 8/1967 |
| JP | 2000-53854 | 2/2000 |
| JP | 2001-172493 | 6/2001 |
| JP | 2004-75770 | 3/2004 |
| JP | 2009-74031 | 4/2009 |
| JP | 2011-105845 | 6/2011 |
| JP | 2012-36271 | 2/2012 |
| WO | 2008/146719 | 12/2008 |
| WO | 2009/001670 | 12/2008 |
| WO | 2012-008344 | 1/2012 |

OTHER PUBLICATIONS

International Search Report issued Apr. 17, 2012 in PCT/JP2012/050494 filed Jan. 12, 2012.
U.S. Appl. No. 14/041,482, filed Sep. 30, 2013, Sasaki, et al.
U.S. Appl. No. 13/970,205, filed Aug. 19, 2013, Yokogi, et al.
U.S. Appl. No. 13/968,519, filed Aug. 16, 2013, Kaito, et al.
Supplementary Extended European Search Report issued Aug. 8, 2014 in corresponding EP Application No. 12764334.4.
First Office Action and Search Report issued Aug. 8, 2014 in corresponding Chinese Application No. 201280016261.1, with English language translation.

*Primary Examiner* — Terressa Boykin
(74) *Attorney, Agent, or Firm* — Oblon, Spivak, McClelland, Maier & Neustadt, L.L.P.

(57) ABSTRACT

The present invention relates to a polycarbonate resin composition, comprising: a polycarbonate resin containing a structural unit derived from a dihydroxy compound having a moiety represented by the following formula (1) [provided that a case where the moiety represented by formula (1) is a moiety constituting —$CH_2$—O—H is excluded]; and an elastomer composed of a core•shell structure, wherein a core layer of the elastomer is at least one member selected from the group consisting of an alkyl (meth)acrylate and a (meth)acrylic acid, and a polycarbonate resin molded article obtained by molding the polycarbonate resin composition:

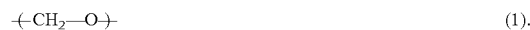

(1).

13 Claims, No Drawings

POLYCARBONATE RESIN COMPOSITION AND MOLDED ARTICLE THEREOF

TECHNICAL FIELD

The present invention relates to a polycarbonate resin composition with an excellent balance of weather resistance, impact resistance, light-blocking effect and the like, and a molded article thereof.

BACKGROUND ART

A polycarbonate is generally produced using a raw material derived from petroleum resources. However, in recent years, depletion of petroleum resources is feared, and it is demanded to provide a polycarbonate using a raw material obtained from biomass resources such as plant.

Also, because of a concern that global warming due to increase or accumulation of carbon dioxide emissions may bring about climate change or the like, it is demanded to develop a polycarbonate using a plant-derived monomer as a raw material and being carbon neutral even when discarded after use.

A technique of obtaining a polycarbonate resin by using isosorbide as a plant-derived monomer and effecting transesterification with diphenyl carbonate has been recently proposed (see, for example, Patent Document 1).

In the case of an aromatic polycarbonate resin that has been heretofore widely used, the impact resistance of the resin itself is excellent, but when isosorbide is used, the impact resistance becomes poor as compared with the aromatic polycarbonate resin, and improvements are needed. To solve this problem, a polycarbonate resin composition containing a polycarbonate resin having a high glass transition temperature and a rubbery polymer has been proposed as a composition capable of enhancing the impact resistance (see, for example, Patent Document 2).

BACKGROUND ART DOCUMENT

Patent Document

Patent Document 1: U.K. Patent No. 1,079,686
Patent Document 2: International Publication No. 08/146,719

SUMMARY OF INVENTION

Problem that Invention is to Solve

Patent Document 2 describes a polycarbonate resin composition using a polycarbonate resin made from a non-aromatic dihydroxy compound as a raw material and, as the rubbery polymer, a polymer having a core•shell structure, but according to detailed studies by the present inventors, in the case of the polycarbonate resin composition described in Patent Document 2, the impact resistance is improved, but there has been found a problem that the advantage of excellent weather resistance as one of characteristic features of the non-aromatic dihydroxy compound is impaired.

In addition, according to the studies by the present inventors, there has been also found a problem that the polycarbonate resin composition described in Patent Document 2 has a poor light-blocking effect and is unsuited for smoked glass applications, for example, a sheet or smoke film application and a glass-alternative building material application such as privacy glass for automobiles or the like and windowpane.

Accordingly, an object of the present invention is to provide a polycarbonate resin composition succeeded in enhancing the impact resistance while maintaining the weather resistance and excellent in the light-blocking effect, and a molded article thereof.

Means for Solving Problem

As a result of many intensive studies to attain the above-described object, the present inventors have found that a polycarbonate resin composition containing a polycarbonate resin of a specific structure and an elastomer composed of a specific core•shell structure can be enhanced in the impact resistance while maintaining the weather resistance and be excellent in the light-blocking effect. The present invention has been accomplished based on this finding.

That is, the gist of the present invention resides in the following [1] to [13].

[1] A polycarbonate resin composition, comprising:
a polycarbonate resin containing a structural unit derived from a dihydroxy compound having a moiety represented by the following formula (1); and
an elastomer composed of a core•shell structure,
wherein a core layer of the elastomer is at least one member selected from the group consisting of an alkyl (meth)acrylate and a (meth)acrylic acid:

[Chem. 1]

$$-(CH_2-O-)-  \quad (1)$$

[provided that a case where the moiety represented by formula (1) is a moiety constituting —$CH_2$—O—H is excluded].

[2] The polycarbonate resin composition as described in [1], wherein when the polycarbonate resin composition is formed into a molded body of 3 mm in thickness, a total light transmittance is 55% or less.

[3] The polycarbonate resin composition as described in [1], comprising the elastomer in an amount of 0.05 to 50 parts by weight per 100 parts by weight of the polycarbonate resin.

[4] The polycarbonate resin composition as described in any one of [1] to [3],
wherein the polycarbonate resin contains a structural unit derived from a dihydroxy compound having a cyclic structure.

[5] The polycarbonate resin composition as described in [4],
wherein the polycarbonate resin contains a structural unit derived from a dihydroxy compound represented by the following formula (2):

[Chem. 2]

(2)

[6] The polycarbonate resin composition as described in any one of [1] to [5],
wherein a shell layer of the elastomer is composed of an alkyl (meth)acrylate.

[7] The polycarbonate resin composition as described in any one of [1] to [5],
wherein the elastomer is at least one core•shell-type graft copolymer selected from the group consisting of an alkyl (meth)acrylate-alkyl (meth)acrylate copolymer, an alkyl (meth)acrylate-acrylonitrile-butadiene-styrene copolymer, an alkyl (meth)acrylate-acryl rubber copolymer, an alkyl (meth)acrylate-acryl rubber-styrene copolymer, an alkyl (meth)acrylate-acryl•butadiene rubber copolymer and an alkyl (meth)acrylate-acryl•butadiene rubber-styrene copolymer.

[8] The polycarbonate resin composition as described in any one of [1] to [7],
wherein the polycarbonate resin contains a structural unit derived from an aliphatic dihydroxy compound.

[9] The polycarbonate resin composition as described in [8],
wherein the polycarbonate resin contains the structural unit derived from an aliphatic dihydroxy compound in an amount of 20 mol % or more based on structural units derived from all dihydroxy compounds.

[10] The polycarbonate resin composition as described in any one of [1] to [9],
wherein the polycarbonate resin contains a structural unit derived from at least one dihydroxy compound selected from the group consisting of a dihydroxy compound having a 5-membered ring structure and a dihydroxy compound having a 6-membered ring structure.

[11] The polycarbonate resin composition as described in any one of [1] to [10],
wherein the polycarbonate resin contains a structural unit derived from at least one dihydroxy compound selected from the group consisting of cyclohexanedimethanols and tricyclodecanedimethanols.

[12] A polycarbonate resin molded article, which is obtained by molding the polycarbonate resin composition as described in any one of [1] to [11].

[13] The polycarbonate resin molded article as described in [12], which is obtained by injection-molding the polycarbonate resin composition.

Effects of Invention

According to the present invention, a polycarbonate resin composition with an excellent balance of weather resistance, impact resistance, light-blocking effect and the like, and a polycarbonate resin molded article thereof can be provided. In a preferred embodiment of the polycarbonate resin composition of the present invention, a polycarbonate resin composition excellent in various physical properties such as color hue, heat resistance and moldability is provided.

MODE FOR CARRYING OUT INVENTION

The mode for carrying out the present invention is described in detail below, but the constituent requirements described below are mere examples (representative examples) of the embodiment of the present invention, and the present invention is not limited to the following contents as long as its gist is observed. Incidentally, the expression "(numerical or physical value) to (numerical or physical value)" as used in the description of the present invention is intended to include the numerical or physical values before and after "to". Also, in the description of the present invention, when a term "substituent" is used, unless otherwise indicated, the substituent is not limited in its kind and means a substituent having a molecular weight up to 200.

[Polycarbonate Resin Composition]

The polycarbonate resin composition of the present invention is a polycarbonate resin composition comprising a polycarbonate resin containing a structural unit derived from a dihydroxy compound having a moiety represented by the following formula (1) [hereinafter, sometimes referred to as "dihydroxy compound (1)"] and an elastomer composed of a core•shell structure, wherein the core layer of the elastomer is at least one member selected from the group consisting of an alkyl (meth)acrylate and a (meth)acrylic acid:

[Chem. 3]

(1)

provided that a case where the moiety represented by formula (1) is a moiety constituting —$CH_2$—O—H is excluded.

The present invention is based on a finding that when a polycarbonate resin containing a structural unit derived from the dihydroxy compound (1) and a core•shell structure-containing elastomer composed of a core•shell structure with the core layer being at least one member selected from the group consisting of an alkyl (meth)acrylate and a (meth)acrylic acid are blended, an effect of enhancing the impact resistance while maintaining the weather resistance, which is unobtainable by the polycarbonate resin composition described in Patent Document 2, can be obtained.

Details of the operation and mechanism for providing such an excellent improvement effect are not clearly known, but it is considered that resulting from selection of a specific polycarbonate resin and an elastomer composed of a specific core•shell structure, the effect is brought about by the interaction between shell and matrix resins, the suppressed reduction of transparency owing to decrease in the refractive index difference, or the weather resistance of the elastomer.

In the polycarbonate resin composition of the present invention, when the polycarbonate resin composition is formed into a molded body of 3 mm in thickness, the total light transmittance is preferably 55% or less, more preferably 45% or less. Although this is described in detail later, the total light transmittance in the range above is preferred particularly in applying the composition to smoked glass applications for making the interior less visible despite lighting, for example, a sheet or smoke film application and a glass-alternative building material application such as privacy glass for automobiles or the like and windowpane. In the applications above, the total light transmittance is preferably high to a certain extent for obtaining lighting and for this reason, the lower limit of the total light transmittance is preferably 5% or more, more preferably 10% or more.

The method for measuring the total light transmittance is described in detail later in Examples. The total light transmittance can be controlled, for example, by increasing the blending amount of the elastomer, blending various pigments or dyes, or a combination thereof.

[Polycarbonate Resin]

The polycarbonate resin for use in the polycarbonate resin composition of the present invention (hereinafter, sometimes referred to as "the polycarbonate resin of the present invention") contains a structural unit derived from a dihydroxy compound having a moiety represented by the following formula (1) [hereinafter, sometimes referred to as "dihydroxy compound (1)"]:

[Chem. 4]

(1)

provided that a case where the moiety represented by formula (1) is a moiety constituting —$CH_2$—O—H is excluded.

The polycarbonate resin for use in the present invention can be obtained by using a dihydroxy compound (1) and a carbonic acid diester as raw materials and polycondensing these material through a transesterification reaction therebetween.

<Raw Material>
(Dihydroxy Compound)

The polycarbonate resin composition of the present invention preferably contains a structural unit derived from a dihydroxy compound (1). The dihydroxy compound (1) is not particularly limited as log as it is a compound having a moiety represented by formula (1) in a part of the structure.

Specific examples thereof include oxyalkylene glycols such as diethylene glycol, triethylene glycol and tetraethylene glycol, a compound having an aromatic group in the side chain and having, in the main chain, an ether group bonded to an aromatic group, such as 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3-isopropylphenyl]fluorene, 9,9-bis[4-(2-hydroxyethoxy)-3-isobutylphenyl]fluorene, [4-(2-hydroxyethoxy)-3-tert-butylphenyl]fluorene, 9,9-bis[4-(2-hydroxyethoxy)-3-cyclohexylphenyl]fluorene, 9,9-bis[4-(2-hydroxyethoxy)-3-phenylphenyl]fluorene, 9,9-bis[4-(2-hydroxyethoxy)-3,5-dimethylphenyl]fluorene, 9,9-bis[4-(2-hydroxyethoxy)-3-tert-butyl-6-methylphenyl]fluorene and 9,9-bis[4-(3-hydroxy-2,2-dimethylpropoxy)phenyl]fluorene, an anhydrous sugar alcohol typified by a dihydroxy compound represented by the following general formula (2), and a compound having a cyclic ether structure, such as spiro glycol represented by the following formula (3) and dihydroxy compound represented by the following formula (4).

Among these dihydroxy compounds (1), in view of availability, handling, reactivity during polymerization, and color hue of the polycarbonate resin obtained, diethylene glycol and triethylene glycol are preferred. In view of heat resistance or light resistance, a sugar alcohol represented by the following formula (2) and a dihydroxy compound having a cyclic ether structure, such as spiro glycol represented by the following formula (3) and dihydroxy compound represented by the following formula (4), are preferred, a sugar alcohol typified by a dihydroxy compound represented by the following formula (2) and a dihydroxy compound having a cyclic ether structure composed of a plurality of rings, such as spiro glycol represented by the following formula (3), preferably having a cyclic ether structure composed of two rings, are more preferred, and an anhydrous sugar alcohol typified by a dihydroxy compound represented by the following formula (2) is still more preferred. One of these compounds may be used alone, or two or more thereof may be used in combination, according to the performance required of the polycarbonate resin obtained.

[Chem. 5]

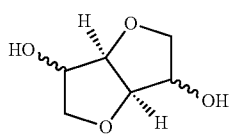

(2)

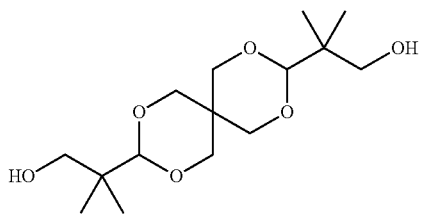

(3)

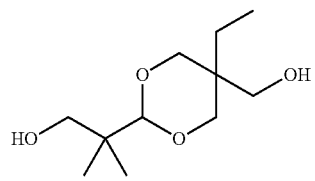

(4)

The dihydroxy compound represented by formula (2) includes, for example, isosorbide, isomannide, and isoidide, which are stereoisomers. One of these compounds may be used alone, or two or more thereof may be used in combination.

Among these dihydroxy compounds (1), use of a dihydroxy compound having no aromatic ring structure is preferred in view of light resistance of the polycarbonate resin obtained, and among others, an isosorbide that is obtained by dehydration condensation of sorbitol produced from various starches existing abundantly as a plant-derived resource and being easily available, is most preferred from the aspect of availability, ease of production, light resistance, optical characteristics, moldability, heat resistance and carbon neutral.

The ratio of the structural unit derived from the dihydroxy compound (1) to structural units derived from all dihydroxy compounds in the polycarbonate resin is preferably 10 mol % or more, more preferably 20 mol % or more, still more preferably 30 mol % or more. On the other hand, the ratio of the structural unit derived from the dihydroxy compound (1) to structural units derived from all dihydroxy compounds in the polycarbonate resin is preferably 60 mol % or less, more preferably 55 mol % or less. By containing the structural unit derived from the dihydroxy compound (1) in the above-described predetermined amount, the polycarbonate resin can excel in the color tone, light resistance and the like.

Also, in order to impart flexibility or ductility, the polycarbonate resin of the present invention preferably contains a structural unit derived from an aliphatic dihydroxy compound (a dihydroxy compound where those except for two hydroxy groups are composed of an aliphatic hydrocarbon), in addition to a structural unit derived from the dihydroxy compound (1). Introducing a structural unit derived from an aliphatic dihydroxy compound into the polycarbonate resin may be attained by using an aliphatic dihydroxy compound as a raw material the polycarbonate resin and copolymerizing it, similarly to the dihydroxy compound (1).

The aliphatic dihydroxy compound includes, for example, a straight-chain aliphatic dihydroxy compound, a branched-chain aliphatic dihydroxy compound, and an alicyclic dihydroxy compound. Among these, an alicyclic dihydroxy compound is preferred.

Specific examples of the aliphatic dihydroxy compound which can be used in the present invention are recited below, and only one of these aliphatic dihydroxy compounds may be used, or two or more thereof may be used in combination.

Examples of the straight-chain aliphatic dihydroxy compound include ethylene glycol, 1,3-propanediol, 1,2-propanediol, 1,4-butanediol, 1,3-butanediol, 1,2-butanediol, 1,5-heptanediol, 1,6-hexanediol, 1,10-decanediol, and 1,12-dodecanediol. Examples of the branched-chain aliphatic dihydroxy compound include neopentyl glycol and hexylene glycol.

The alicyclic dihydroxy compound is a compound having a hydrocarbon framework of a cyclic structure and two hydroxy groups, and the hydroxy group may be bonded directly to the cyclic structure or may be bonded to the cyclic structure through a substituent such as alkylene group. The cyclic structure may be monocyclic or polycyclic.

The alicyclic dihydroxy compound is preferably, for example, an alicyclic dihydroxy compound having a 5-membered ring structure or an alicyclic dihydroxy compound having a 6-membered ring structure, which are described below. An alicyclic dihydroxy compound having a 5-membered ring structure or an alicyclic dihydroxy compound having a 6-membered ring structure is used as the alicyclic dihydroxy compound, and a structural unit derived from the compound is introduced into the polycarbonate resin, whereby heat resistance of the polycarbonate resin can be enhanced.

The carbon number of the alicyclic dihydroxy compound is usually preferably 70 or less, more preferably 50 or less, still more preferably 30 or less. As the carbon number is larger, the heat resistance of the polycarbonate resin obtained tends to be higher, but the synthesis or purification of the polycarbonate resin may become difficult or the cost may rise, whereas as the carbon number of the alicyclic dihydroxy compound is smaller, the purification is easier and the raw material procurement is facilitated.

Examples of the alicyclic dihydroxy compound having a 5-membered ring structure include tricyclodecanediols; pentacyclopentadecanediols; decalindiols such as 2,6-decalindiol, 1,5-decalindiol and 2,3-decalindiol; tricyclotetradecanediols; tricyclodecanedimethanols; and pentacyclopentadecanedimethanols.

Examples of the alicyclic dihydroxy compound having a 6-membered ring structure include cyclohexanediols such as 1,2-cyclohexanediol, 1,3-cyclohexanediol, 1,4-cyclohexanediol, and 2-methyl-1,4-cyclohexanediol; cyclohexenediols such as 4-cyclohexene-1,2-diol; norbornanediols such as 2,3-norbornanediol and 2,5-norbornanediol; adamantanediols such as 1,3-adamantanediol and 2,2-adamantanediol; cyclohexanedimethanols such as 1,2-cyclohexanedimethanol, 1,3-cyclohexanedimethanol and 1,4-cyclohexanedimethanol; cyclohexenedimethanols such as 4-cyclohexene-1,2-dimethanol; norbornanedimethanols such as 2,3-norbornanedimethanol and 2,5-norbornanedimethanol; and adamantanedimethanols such as 1,3-adamantanedimethanol and 2,2-adamantanedimethanol.

Among these alicyclic dihydroxy compounds, cyclohexanedimethanols, tricyclodecanedimethanols, adamantanediols and pentacyclopentadecanedimethanols are preferred, and cyclohexanedimethanols and tricyclodecanedimethanol are more preferred.

When cyclohexanedimethanols are used, the obtained polycarbonate resin tends to be enhanced particularly in the flexibility or ductility. Also, when tricyclodecanedimethanols are used, the polycarbonate resin obtained tends to have an excellent balance between the surface hardness and the ductility. Among cyclohexanedimethanols, 1,4-cyclohexanedimethanol is preferred.

Thanks to a configuration where the polycarbonate resin contains both a structural unit derived from the dihydroxy compound (1) and a structural unit derived from an aliphatic dihydroxy compound such as alicyclic dihydroxy compound, an effect of not only improving the transparency or impact resistance of the polycarbonate resin but also improving various physical properties such as flexibility, heat resistance and moldability can be obtained.

If the proportion of the structural unit derived from an aliphatic dihydroxy compound such as alicyclic dihydroxy compound in the polycarbonate resin of the present invention is too small, a polycarbonate resin composition formed tends to suffer from bad dispersion of the elastomer in the polycarbonate resin, difficulty in obtaining the effect of improving the surface impact resistance, and a rise in the glass transition temperature of the polycarbonate resin.

If the proportion of the structural unit derived from an aliphatic dihydroxy compound such as alicyclic dihydroxy compound in the polycarbonate resin of the present invention is too large, the reduced viscosity of the polycarbonate resin may become high to cause reduction in the flowability during molding and worsen the productivity or moldability.

In particular, when the ratio of the structural unit derived from the aliphatic dihydroxy compound to structural units derived from all dihydroxy compounds in the polycarbonate resin is 20 mol % or more, the polycarbonate resin composition formed can excel in the light reflectance or impact resistance.

The ratio of the structural unit derived from an aliphatic dihydroxy compound such as alicyclic dihydroxy compound to structural units derived from all dihydroxy compounds in the polycarbonate resin is preferably 20 mol % or more, more preferably 40 mol % or more, still more preferably 45 mol % or more.

The ratio of the structural unit derived from an aliphatic dihydroxy compound such as alicyclic dihydroxy compound to structural units derived from all dihydroxy compounds in the polycarbonate resin is preferably 90 mol % or less, more preferably 80 mol % or less, still more preferably 70 mol % or less.

Incidentally, in the polycarbonate resin of the present invention, a structural unit deemed to come under both a structural unit derived from the dihydroxy compound (1) and a structural unit derived from an aliphatic dihydroxy compound may be contained. In the case of containing such a structural unit, after satisfying the requirement of containing at least a structural unit derived from the dihydroxy compound (1), the structural unit deemed to come under both a structural unit derived from the dihydroxy compound (1) and a structural unit derived from an aliphatic dihydroxy compound may be arbitrarily classed.

The polycarbonate resin of the present invention may contain a structural unit derived from a dihydroxy compound other than the dihydroxy compound (1) and the aliphatic dihydroxy compound (hereinafter, sometimes referred to as "other dihydroxy compounds").

More specifically, the other dihydroxy compounds include, for example, aromatic bisphenols such as 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis[4-hydroxy-(3,5-diphenyl)phenyl]propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenyl sulfone, bis(4-hydroxyphenyl)sulfide, 4,4'-dihydroxydiphenyl ether, 4,4'-dihydroxy-3,3'-dichlorodiphenyl ether, 9,9-bis(4-hydroxyphenyl)fluorene, and 9,9-bis(4-hydroxy-2-methylphenyl)fluorene.

In view of light resistance of the polycarbonate resin, the other dihydroxy compound is preferably a compound having no aromatic ring structure in the molecular structure. One of these other dihydroxy compounds may be used alone, or two or more thereof may be used in combination, according to the performance required of the polycarbonate resin obtained.

In the case where the polycarbonate resin of the present invention contains a structural unit derived from other dihydroxy compounds, the ratio of the structural unit derived from the other dihydroxy compound to structural units derived from all dihydroxy compounds in the polycarbonate resin is preferably 40 mol % or less, more preferably 30 mol % or less, still more preferably 20 mol % or less, yet still more preferably 10 mol % or less.

The dihydroxy compound for use in the production of the polycarbonate resin of the present invention may contain a stabilizer such as reducing agent, antioxidant, oxygen scavenger, light stabilizer, antacid, pH stabilizer and heat stabilizer. Particularly, under acidic conditions, the dihydroxy compound is susceptible to property change and therefore, preferably contains a basic stabilizer.

Examples of the basic stabilizer include a hydroxide, a carbonate, a phosphate, a phosphite, a hypophosphite, a borate and a fatty acid salt, of a metal belonging to Group 1 or 2 of the long-form periodic table (Nomenclature of Inorganic Chemistry IUPAC Recommendations 2005); a basic ammonium compound such as tetramethylammonium hydroxide, tetraethylammonium hydroxide, tetrapropylammonium hydroxide, tetrabutylammonium hydroxide, trimethylethylammonium hydroxide, trimethylbenzyl ammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide; and an amine-based compound such as 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline. Among others, a phosphate and a phosphite of sodium or potassium are preferred in view of the effect and the later-described easy removal by distillation, and disodium hydrogen phosphate and disodium hydrogen phosphite are more preferred.

The content of the basic stabilizer in the dihydroxy compound is not particularly limited, but if the content is too small, the effect of preventing property change of the dihydroxy compound may not be obtained, whereas if the content is too large, this may cause property modification of the dihydroxy compound. Therefore, usually, the content is preferably from 0.0001 to 1 wt %, more preferably from 0.001 to 0.1 wt %, based on the dihydroxy compound.

Also, when the dihydroxy compound containing such a basic stabilizer is used as a raw material for the production of the polycarbonate resin, the basic stabilizer not only serves itself as a polymerization catalyst, making it difficult to control the polymerization rate and quality, but also involves worsening of the initial color to impair the light resistance of the polycarbonate resin molded article obtained. Therefore, before using the dihydroxy compound as a raw material for the production of the polycarbonate resin, the basic stabilizer is preferably removed by using an ion-exchange resin, distillation or the like.

In the case of a dihydroxy compound containing a cyclic ether structure, such as isosorbide, the dihydroxy compound is likely to be gradually oxidized by oxygen and therefore, it is preferred to inhibit water inclusion during storage or production for preventing decomposition by oxygen and use an oxygen scavenger or the like or treat the dihydroxy compound in a nitrogen atmosphere. When isosorbide is oxidized, a decomposition product such as formic acid may be generated. For example, when isosorbide containing such a decomposition product is used as a raw material for the production of the polycarbonate resin, this may lead to coloring of the polycarbonate resin obtained or may not only be involved in significant deterioration of the physical properties but also affect the polymerization reaction, failing in obtaining a polymer having a high molecular weight.

In order to obtain a dihydroxy compound free from the above-described oxidation decomposition product or remove the basic stabilizer, it is preferred to perform distillation/purification of the dihydroxy compound. The distillation in this case may be simple distillation or continuous distillation and is not particularly limited. As for the distillation conditions, distillation is preferably performed under reduced pressure in an inert gas atmosphere such as argon or nitrogen, and from the standpoint of preventing property modification due to heat, distillation is preferably performed under the condition of preferably 250° C. or less, more preferably 200° C. or less, still more preferably 180° C. or less.

Through such distillation/purification, the content of formic acid in the dihydroxy compound for use in the present invention is reduced to 20 ppm by weight or less, preferably 10 ppm by weight or less, more preferably 5 ppm by weight or less, whereby a polycarbonate resin excellent in the color hue and thermal stability can be produced without impairing the polymerization reactivity during production of the polycarbonate resin. Measurement of the formic acid content is performed by ion chromatography.

(Carbonic Acid Diester)

The polycarbonate resin of the present invention can be obtained by using a dihydroxy compound containing the above-described dihydroxy compound (1) and a carbonic acid diester as raw materials and polycondensing these materials through a transesterification reaction therebetween.

The carbonic acid diester used includes usually a compound represented by the following formula (5). One of these carbonic acid diesters may be used alone, or two or more thereof may be mixed and used.

[Chem. 6]

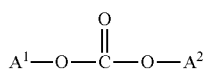

(5)

In formula (5), each of $A^1$ and $A^2$ is independently a substituted or unsubstituted aliphatic hydrocarbon group having a carbon number of 1 to 18 or a substituted or unsubstituted aromatic hydrocarbon group. Each of $A^1$ and $A^2$ is preferably a substituted or unsubstituted aromatic hydrocarbon group, more preferably an unsubstituted aromatic hydrocarbon group.

Examples of the carbonic aid diester represented by formula (5) include diphenyl carbonate, a substituted diphenyl carbonate such as ditolyl carbonate, dimethyl carbonate, diethyl carbonate, and di-tert-butyl carbonate. Among these, diphenyl carbonate and a substituted diphenyl carbonate are preferred, and diphenyl carbonate is more preferred.

Incidentally, the carbonic acid diester sometimes contains an impurity such as chloride ion, and the impurity may inhibit the polymerization reaction or worsen the color hue of the polycarbonate resin obtained. Therefore, it is preferred to use a carbonic acid diester that has been purified by distillation or the like as needed.

<Transesterification Reaction Catalyst>

The polycarbonate resin of the present invention is produced usually by a transesterification reaction between a dihydroxy compound containing the dihydroxy compound (1) and a carbonic acid diester represented by formula (5). More specifically, a dihydroxy compound containing the dihydroxy compound (1) and a carbonic acid diester represented by formula (5) are polycondensed by a transesterification reaction, and a monohydroxy compound or the like produced as a by-product is removed out of the system, whereby the polycarbonate resin is obtained. In this case, the polycondensation is usually performed by a transesterification reaction in the presence of a transesterification reaction catalyst.

The transesterification reaction catalyst (hereinafter, sometimes simply referred to as "catalyst" or "polymerization catalyst") which can be used in the production of the polycarbonate resin of the present invention may affect the transparency or color hue in particular.

The catalyst used is not limited as long as it can satisfy the light resistance, transparency, color hue, heat resistance, thermal stability and mechanical strength, among others, the light resistance, of the produced polycarbonate resin, but the catalyst includes, for example, a compound of a metal belonging to Group 1 or 2 of the long-form periodic table (hereinafter, simply referred to as "Group 1" or "Group 2"), and a basic compound such as basic boron compound, basic phosphorus compound, basic ammonium compound and amine-based compound. Preferably, a Group 1 metal compound and/or a Group 2 metal compound are used.

Together with a Group 1 metal compound and/or a Group 2 metal compound, a basic compound such as basic boron compound, basic phosphorus compound, basic ammonium compound and amine-based compound may be secondarily used in combination, but it is particularly preferred to use only a Group 1 metal compound and/or a Group 2 metal compound.

As for the form of the Group 1 metal compound and/or Group 2 metal compound, the compound is usually used in the form of a hydroxide or a salt such as carbonate, carboxylate and phenoxide, but a hydroxide, a carbonate and an acetate are preferred in view of availability and handleability, and an acetate is preferred in view of color hue and polymerization activity.

The Group 1 metal compound includes, for example, sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, sodium boron phenylate, potassium boron phenylate, lithium boron phenylate, cesium boron phenylate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, alcoholates and phenolates of sodium, potassium, lithium and cesium, and disodium, dipotassium, dilithium and dicesium salts of bisphenol A. Among these, a lithium compound is preferred.

The Group 2 metal compound includes, for example, calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Among these, a magnesium compound, a calcium compound and a barium compounds are preferred, a magnesium compound and/or a calcium compound are more preferred in view of the polymerization activity and color hue of the obtained polycarbonate resin, and a calcium compound is most preferred.

The basic boron compound includes, for example, sodium, potassium, lithium, calcium, barium, magnesium and strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron and butyltriphenylboron.

The basic phosphorus compound includes, for example, triethylphosphine, tri-n-propylphosphine, triisopropylphosphine, tri-n-butylphosphine, triphenylphosphine, tributylphosphine, and a quaternary phosphonium salt.

The basic ammonium compound includes, for example, tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

The amine-based compound includes, for example, 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

Of these compounds, a least one metal compound selected from the group consisting of a lithium compound and a compound of a metal belonging to Group 2 of the long-form periodic table is preferably used as the catalyst so as to obtain a polycarbonate resin excellent in various physical properties such as transparency, color hue and light resistance.

Also, in order to make the polycarbonate resin of the present invention excel particularly in the transparency, color hue and light resistance, the catalyst is preferably at least one metal compound selected from the group consisting of a magnesium compound and a calcium compound.

The amount of the polymerization catalyst used is preferably from 0.1 to 300 µmol, more preferably from 0.5 to 100 µmol, per mol of all dihydroxy compounds used for the polymerization. Among other, in the case of using a compound containing at least one metal selected from the group consisting of lithium and Group 2 of the long-form periodic table, particularly, in the case of using a magnesium compound and/or a calcium compound, the amount of the catalyst is, in terms of metal amount, preferably 0.1 µmol or more, more preferably 0.5 µmol or more, still more preferably 0.7 µmol or more, per mol of all dihydroxy compounds. The upper limit is preferably 20 µmol, more preferably 10 µmol, still more preferably 3 µmol, and most preferably 2.0 µmol.

If the amount of the catalyst used is too small, the polymerization rate decreases, as a result, the polymerization temperature must be raised so as to obtain a polycarbonate resin having a desired molecular weight, leading to worsening of the color hue or light resistance of the obtained polycarbonate resin, or an unreacted raw material may volatilize during polymerization to disrupt the mol ratio between a dihydroxy compound containing the dihydroxy compound (1) and the carbonic acid diester represented by formula (5), failing in reaching the desired molecular weight. On the other hand, if the amount of the polymerization catalyst used is too large, this may cause worsening of the color hue of the obtained polycarbonate resin and in turn, the light resistance of the polycarbonate resin may be impaired.

<Production Process of Polycarbonate Resin>

The polycarbonate resin of the present invention is obtained by polycondensing a dihydroxy compound containing the dihydroxy compound (1) and a carbonic acid diester of formula (5) through a transesterification reaction therebetween, and the dihydroxy compound and the carbonic acid diester as raw materials are preferably mixed uniformly before the transesterification reaction.

The mixing temperature is usually preferably 80° C. or more, more preferably 90° C. or more, and the upper limit thereof is usually preferably 250° C. or less, more preferably 200° C. or less, still more preferably 150° C. or less. Above all, the mixing temperature is preferably form 95 to 120° C. If the mixing temperature is too low, a slow dissolution rate or insufficient solubility may result and a trouble such as solidification is often caused, whereas if the mixing temperature is too high, this may invite thermal deterioration of the dihydroxy compound, as a result, the color hue of the obtained polycarbonate resin may be worsened to adversely affect the light resistance.

Also, from the standpoint of preventing worsening of the color hue of the obtained polycarbonate resin, the operation of mixing a dihydroxy compound containing the dihydroxy compound (1) and a carbonic acid diester represented by formula (5) is preferably performed in an atmosphere having an oxygen concentration of preferably 10 vol % or less, more preferably from 0.0001 to 10 vol %, still more preferably from 0.0001 to 5 vol %, yet still more preferably from 0.0001 to 1 vol %.

The carbonic acid diester represented by formula (5) is preferably used in a mol ratio of 0.90 to 1.20, more preferably from 0.95 to 1.10, based on the dihydroxy compound containing the dihydroxy compound (1).

If this mol ratio is too small, the content of the terminal hydroxyl group of the polycarbonate resin produced may be increased, giving rise to worsening of the thermal stability of the polycarbonate resin, occurrence of coloring during molding, reduction in the transesterification reaction rate, or failure in obtaining a desired high-molecular polymer.

Also, if the mol ratio is too large, this may cause reduction in the transesterification reaction rate or make it difficult to produce a polycarbonate resin having a desired molecular weight. The reduction in the transesterification reaction rate leads to an increase in the heat history during polymerization reaction and in turn, worsening of the color hue or light resistance of the polycarbonate resin obtained.

Furthermore, if the mol ratio of the carbonic acid diester represented by formula (5) to the dihydroxy compound containing the dihydroxy compound (1) is increased, there is a tendency that the amount of the carbonic acid diester remaining in the obtained polycarbonate resin increases and such a residual carbonic acid diester absorbs an ultraviolet ray to worsen the light resistance of the polycarbonate resin.

The concentration of the carbonic acid diester remaining in the polycarbonate resin of the present invention is preferably 200 ppm by weight or less, more preferably 100 ppm by weight or less, still more preferably 60 ppm by weight or less, yet still more preferably 30 ppm by weight or less. The polycarbonate resin composition actually sometimes contains an unreacted carbonic acid diester, and the lower limit of the concentration of the unreacted carbonic acid diester in the polycarbonate resin is usually 1 ppm by weight.

In the present invention, the method for causing polycondensation of the dihydroxy compound and the carbonic acid diester is performed in the presence of the above-described catalyst usually in multiple stages by using a plurality of reaction vessels. The mode of reaction operation may be any of a batch system, a continuous system, and a combination of a batch system and a continuous system.

As for the polymerization conditions, the polymerization is preferably performed at a relatively low temperature under relatively low vacuum in its initial stage to obtain a prepolymer and performed at a relatively high temperature under relatively high vacuum in the later stage of polymerization to increase the molecular weight to a predetermined value, but in view of color hue and light resistance of the obtained polycarbonate resin, it is important to appropriately select the jacket temperature, the internal temperature and the pressure inside the reaction system for each molecular weight stage. For example, if either one of the temperature and the pressure is changed too early before the polymerization reaction reaches a predetermined value, an unreacted monomer may be distilled off to disrupt the mol ratio between the dihydroxy compound and the carbonic acid diester, leading to a drop of the polymerization rate.

Furthermore, for reducing the amount of a monomer distilled off, it is effective to use a reflux condenser in the polymerization reaction vessel, and the effect thereof is great particularly in the reaction vessel at the initial polymerization stage involving generation of many unreacted monomers. The temperature of the cooling medium introduced into the reflux condenser may be appropriately selected according to the monomers used, but the temperature of the cooling medium introduced into the reflux condenser is, at the inlet of the reflux condenser, usually preferably from 45 to 180° C., more preferably from 80 to 150° C., still more preferably from 100 to 130° C. If the temperature of the cooling medium introduced into the reflux condenser is too high, the reflux amount decreases to reduce the effect, whereas if the temperature is too low, the distillation efficiency for the monohydroxy compound that should be originally removed by distillation tends to decrease. The cooling medium includes, for example, warm water, steam, and heating medium oil, and steam or a heating medium oil is preferred.

In order not to impair the color hue, thermal stability, light resistance and the like of the finally obtained polycarbonate resin while appropriately maintaining the polymerization rate and suppressing distillation off of monomers, selection of the kind and amount of the catalyst described above is important.

The polycarbonate resin of the present invention is preferably produced by using a catalyst and performing the polymerization in multiple stages with use of a plurality of reaction vessels, and the reason why the polymerization is performed using a plurality of reaction vessels is that: in the initial stage of polymerization reaction, the content of monomers in the reaction solution is large and therefore, it is important to suppress volatilization of monomers while maintaining a necessary polymerization rate; and in the later stage of polymerization reaction, it is important to sufficiently distill off the by-product monohydroxy compound so as to shift the equilibrium to the polymerization side. For setting different polymerization reaction conditions in this way, a plurality of polymerization reaction vessels arranged in series are preferably used in view of production efficiency.

The number of reaction vessels suitably used in the production of the polycarbonate resin of the present invention is, as described above, preferably at least 2 or more, and in view of production efficiency and the like, more preferably 3 or more, still more preferably from 3 to 5, yet still more preferably 4. In the present invention, when two or more reaction vessels are used, the reaction vessels may be designed to, for example, further have a plurality of reaction stages differing in the conditions or be continuously changed in the temperature•pressure.

In the present invention, the polymerization catalyst may be added to a raw material preparation tank or a raw material storage tank or may be added directly to a polymerization tank, but in view of feed stability and polymerization control, the catalyst is preferably fed in the form of an aqueous solution by disposing a catalyst feed line in the middle of a raw material line before feeding to a polymerization tank.

If the polymerization reaction temperature is too low, this may lead to a decrease in productivity or an increase in heat history of the product, whereas if the temperature is too high, not only volatilization of monomers is caused but also decomposition or coloring of the obtained polycarbonate resin may be promoted.

The polymerization reaction is specifically performed, for example, by allowing the reaction in the first stage to proceed at a temperature of, in terms of maximum internal temperature of the polymerization reaction vessel, preferably from 140 to 270° C., more preferably from 180 to 240° C., still more preferably from 200 to 230° C., under a pressure of, in terms of absolute pressure, preferably from 110 to 10 kPa, more preferably from 70 to 5 kPa, still more preferably from 30 to 1 kPa, for a reaction time of preferably from 0.1 to 10 hours, more preferably from 0.5 to 3 hours, while removing the generated monohydroxy compound by distillation out of the reaction system.

In the second and subsequent stages, the pressure (absolute pressure) of the reaction system is caused to finally reach preferably 200 Pa or less by gradually lowering the pressure of the reaction system from the pressure in the first stage, and the reaction is performed at a maximum internal temperature of the polymerization reaction vessel of preferably from 210 to 270° C., more preferably from 220 to 250° C., usually for preferably from 0.1 to 10 hours, more preferably from 1 to 6 hours, still more preferably from 0.5 to 3 hours, while removing the continuously generated monohydroxy compound out of the reaction system.

Above all, in order to obtain a polycarbonate resin excellent in the color hue and light resistance by preventing coloring or thermal deterioration of the obtained polycarbonate resin, the maximum internal temperature in all reaction stages is preferably less than 250° C., more preferably from 225 to 245° C. Also, for inhibiting a drop of the polymerization rate in the latter half of the polymerization reaction and minimizing deterioration due to heat history, a horizontal reaction vessel excellent in the plug-flow properties and interface renewal properties is preferably used in the final stage of polymerization.

If a high polymerization temperature and a too long polymerization time are employed so as to increase the molecular weight of the obtained polycarbonate resin, the transparency or color hue tends to be worsened.

In view of effective utilization of resources, the by-product monohydroxy compound is preferably purified, if desired, and then reused as a raw material of diphenyl carbonate, bisphenol A or the like.

Here, in the case of producing the polycarbonate resin by using, as the carbonic acid diester represented by formula (5), diphenyl carbonate or a substituted diphenyl carbonate such as ditolyl carbonate, phenol or a substituted phenol is unavoidably produced as a by-product and remains in the polycarbonate resin, and both phenol and a substituted phenol have an aromatic ring and not only may absorb an ultraviolet ray, leading to worsening of the light resistance, but also may give rise to an odor during molding.

The polycarbonate resin after a normal batch reaction contains 1,000 ppm by weight or more of an aromatic monohydroxy compound having an aromatic ring, such as by-product phenol, and in view of light resistance or reduction in the odor, the content of the aromatic monohydroxy compound in the polycarbonate resin is preferably reduced to 700 ppm by weight or less, more preferably 500 ppm by weight or less, still more preferably 300 ppm by weight or less, by using a horizontal reaction vessel excellent in the devolatilizing performance or using an extruder with a vacuum vent.

However, it is industrially difficult to completely remove the aromatic monohydroxy compound, and the lower limit of the content of the aromatic monohydroxy compound in the polycarbonate resin is usually 1 ppm by weight. Incidentally, such an aromatic monohydroxy compound may of course have a substituent depending on the raw materials used and may have, for example, an alkyl group having a carbon number of 5 or less.

Also, a Group 1 metal, among others, lithium, sodium, potassium and cesium, particularly, sodium, potassium and cesium, may migrate not only from the catalyst used but also from the raw material or reaction apparatus, and such a metal, when contained in a large amount in the polycarbonate resin, may adversely affect the color hue. Therefore, the total amount of these compounds in the polycarbonate resin of the present invention is preferably smaller and is usually, in terms of metal amount, preferably 1 ppm by weight or less, more preferably 0.8 ppm by weight or less, still more preferably 0.7 ppm by weight or less.

The metal amount in the polycarbonate resin can be measured by various conventionally known methods. For example, the metal in the polycarbonate resin composition is recovered by a wet ashing method or the like, and thereafter, the metal amount can be measured by atomic emission, atomic absorption, Inductively Coupled Plasma (ICP) or other methods.

The polycarbonate resin of the present invention is usually cooled/solidified after polycondensation as described above and then pelletized by a rotary cutter or the like. The method for pelletization is not limited, but examples thereof include: a method where the resin is withdrawn in a molten state from the final polymerization reaction vessel, cooled/solidified in the form of a strand and then pelletized; a method where the resin is fed in a molten state from the final polymerization reaction vessel to a single- or twin-screw extruder, melt-extruded, cooled/solidified and then pelletized; and a method where the resin is withdrawn in a molten state from the final polymerization reaction vessel, cooled/solidified in the form of a strand and once pelletized and thereafter, the resin is again fed to a single- or twin-screw extruder, melt-extruded, cooled/solidified and then pelletized.

At this time, in the extruder, residual monomers may be devolatilized under reduced pressure, and a heat stabilizer, a neutralizing agent, an ultraviolet absorber, a release agent, a coloring agent, an antistatic agent, a slip agent, a lubricant, a plasticizer, a compatibilizer, a flame retardant and the like, which are usually known, may be also added and kneaded.

The melt kneading temperature in the extruder depends on the glass transition temperature or molecular weight of the polycarbonate resin but is usually preferably from 150 to 300°

C., more preferably from 200 to 270° C., still more preferably from 230 to 260° C. By setting the melt kneading temperature to 150° C. or more, the melt viscosity of the polycarbonate resin is kept low, as a result, the load on the extruder is reduced and the productivity is enhanced. By setting the melt kneading temperature to 300° C. or less, the polycarbonate resin can be prevented from thermal deterioration, making it possible to suppress mechanical strength reduction or coloring due to decrease of the molecular weight, or gas evolution.

At the production of the polycarbonate resin of the present invention, a filter is preferably installed so as to prevent inclusion of an extraneous matter. The filter installation position is preferably on the downstream side of the extruder, and the rejection size (opening size) of the filter for an extraneous matter is preferably 100 µm or less in terms of filtration accuracy for 99% removal. Particularly, in the case of avoiding inclusion of a fine extraneous matter in the film application or the like, the filtration accuracy is preferably 40 µm or less, more preferably 10 µm or less.

In order to prevent inclusion of an extraneous matter after extrusion, the extrusion of the polycarbonate resin of the present invention is preferably performed in a clean room having a cleanliness defined in JIS B 9920 (2002) of preferably higher than class 7, more preferably higher than class 6.

Also, at the time of cooling and chip-forming the extruded polycarbonate resin, a cooling method such as air cooling and water cooling is preferably used. As for the air used in air cooling, an air in which an airborne extraneous matter is previously removed through a hepafilter or the like is preferably used so as to prevent reattachment of an airborne extraneous matter. In the case of employing water cooling, water in which a metallic matter is removed by using an ion-exchange resin or the like and an extraneous matter in water is removed through a filter, is preferably used. The opening size of the filter used is preferably from 10 to 0.45 µm in terms of filtration accuracy for 99% removal.

<Physical Properties of Polycarbonate Resin>

The molecular weight of the polycarbonate resin of the present invention can be expressed by a reduced viscosity, and the reduced viscosity of the polycarbonate resin of the present invention is usually preferably 0.30 dL/g or more, more preferably 0.35 dL/g or more, and usually preferably 1.20 dL/g or less, more preferably 1.00 dL/g or less, still more preferably 0.80 dL/g or less.

If the reduced viscosity of the polycarbonate resin is too low, the mechanical strength of the molded article tends to be low, whereas if the reduced viscosity is too high, there is a tendency that flowability at the time of molding the polycarbonate resin composition of the present invention is reduced and the productivity and moldability are impaired.

Incidentally, the reduced viscosity of the polycarbonate resin is determined by preparing a solution having a polycarbonate concentration precisely adjusted to 0.6 g/dL with use of methylene chloride as a solvent and measuring the viscosity by means of an Ubbelohde viscosity tube at a temperature of 20.0° C.±0.1° C.

Furthermore, the lower limit of the concentration of the terminal group represented by the following formula (6) in the polycarbonate resin of the present invention is usually preferably 20 µeq/g, more preferably 40 µeq/g, still more preferably 50 µeq/g, and the upper limit is usually preferably 160 µeq/g, more preferably 140 µeq/g, still more preferably 100 µeq/g.

[Chem. 7]

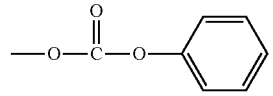

(6)

If the concentration of the terminal group represented by formula (6) in the polycarbonate resin is too high, even when the color hue immediately after polymerization or during molding is good, worsening of the color hue may be caused after exposure to an ultraviolet ray, whereas if the concentration is too low, thermal stability may be reduced.

The method for controlling the concentration of the terminal group represented by formula (6) includes, for example, a method of controlling the mol ratio between raw materials, that is, a dihydroxy compound containing the dihydroxy compound (1) and a carbonic acid diester represented by formula (5), and a method of controlling the kind or amount of a catalyst, the polymerization pressure, or the polymerization temperature, at the transesterification reaction.

Also, assuming that the molar number of hydrogen bonded to the aromatic ring in the polycarbonate resin of the present invention is "X" and the molar number of H bonded to a site other than the aromatic ring is "Y", the ratio of the molar number of hydrogen bonded to the aromatic ring to the molar number of all hydrogens is expressed by X/(X+Y), and since the aromatic ring having an ultraviolet absorbing ability may affect the light resistance as described above, the ratio X/(X+Y) of the polycarbonate resin of the present invention is preferably 0.1 or less, more preferably 0.05 or less, still more preferably 0.02 or less, yet still more preferably 0.01 or less. The X/(X+Y) can be quantitatively determined by $^1$H-NMR.

The glass transition temperature of the polycarbonate resin of the present invention is preferably from 75° C. to less than 145° C., more preferably from 80 to 140° C., still more preferably from 85 to 135° C. By using a polycarbonate resin where the glass transition temperature is in the range above, a molded article having excellent heat resistance can be provided.

[Elastomer]

The polycarbonate resin composition of the present invention comprises the above-described polycarbonate resin of the present invention and an elastomer composed of a core•shell structure, wherein the core layer of the elastomer is at least one member selected from the group consisting of an alkyl (meth)acrylate and a (meth)acrylic acid. In the description of the present invention, the "elastomer composed of a core•shell structure" indicates a core•shell-type graft copolymer consisting of an innermost layer (core layer) and one or more layers (shell layer) covering the core layer, in which a monomer component graft-copolymerizable with the core layer is graft copolymerized as a shell layer. Here, the "(meth)acryl" in the "alkyl (meth)acrylate" and "(meth)acrylic acid" is a term collectively including "acryl" and "methacryl".

The elastomer composed of a core•shell structure for use in the present invention is preferably a core•shell-type graft copolymer where, usually, a polymer component called a rubber component is used as the core layer and a monomer component copolymerizable therewith is graft copolymerized as the shell layer.

The production process for the core•shell-type graft copolymer may be any of the production processes such as bulk polymerization, solution polymerization, suspension polymerization and emulsion polymerization, and the mode of copolymerization may be single-stage or multi-stage graft copolymerization. However, in the present invention, usually, a commercially available core•shell-type elastomer can be used as it is. Examples of the commercially available core•shell-type elastomer are recited later.

The polymer component forming the core layer usually has a glass transition temperature of preferably 0° C. or less, more preferably −20° C. or less, still more preferably −30° C. or less. Specific examples of the polymer component forming the core layer include a polyalkyl acrylate such as butyl (meth)acrylate polymer, 2-ethylhexyl (meth)acrylate polymer and butyl (meth)acrylate-2-ethylhexyl (meth)acrylate copolymer. One of these may be used alone, or two or more thereof may be mixed and used. Among these, in view of mechanical characteristics or surface appearance, an alkyl acrylate polymer is preferred.

Incidentally, for example, if a silicon atom, a sulfur atom, a nitrogen atom or the like is contained as the polymer component, as in the case where the core layer is formed of a silicon•acryl composite compound, the weather resistance or light resistance may be deteriorated. Therefore, such a component cannot be contained in the polymer component forming the core layer of the present invention.

Specific examples of the monomer component constituting a shell layer and being graft-copolymerizable with the rubber component of the core layer include an epoxy group-containing (meth)acrylic acid ester compound such as aromatic vinyl compound, vinyl cyanide compound, (meth)acrylic acid ester compound, (meth)acrylic acid compound and alkyl glycidyl (meth)acrylate; a maleimide compound such as maleimide, N-methylmaleimide and N-phenylmaleimide; and an α,β-unsaturated carboxylic acid compound such as maleic acid, phthalic acid and itaconic acid, or an anhydride thereof (for example, maleic anhydride).

One of these monomer components may be used alone, or two or more thereof may be used in combination, Among these, in view of mechanical characteristics or surface appearance, an aromatic vinyl compound, a vinyl cyanide compound, a (meth)acrylic acid ester compound and a (meth) acrylic acid compound are preferred, and a (meth)acrylic acid ester compound is more preferred.

Specific examples of the (meth)acrylic acid ester compound include methyl (meth)acrylate, ethyl (meth)acrylate, butyl (meth)acrylate, cyclohexyl (meth)acrylate, and octyl (meth)acrylate. Among these, methyl (meth)acrylate and ethyl (meth)acrylate, which are relatively easily available, are preferred, and methyl (meth)acrylate is more preferred. Here, the "(meth)acryl" is a term collectively including "acryl" and "methacryl", similarly to the core layer.

The elastomer composed of a core•shell structure for use in the present invention is, among others, preferably a core•shell-type graft copolymer consisting of a core layer formed of an alkyl (meth)acrylate polymer and/or a (meth) acrylic acid polymer and a shell layer formed by copolymerizing a (meth)acrylic acid ester in the periphery thereof. The core•shell-type graft copolymer preferably contains the rubber component in an amount of 40 wt % or more, more preferably 60 wt % or more. Also, the (meth)acrylic acid ester component is preferably contained in an amount of 10 wt % or more.

Specific preferred examples of the core•shell-type graft copolymer include an alkyl (meth)acrylate-alkyl (meth)acrylate copolymer, an alkyl (meth)acrylate-acrylonitrile-butadiene-styrene copolymer, an alkyl (meth)acrylate-acrylic rubber copolymer, an alkyl (meth)acrylate-acrylic rubber-styrene copolymer, an alkyl (meth)acrylate-acrylic-butadiene rubber copolymer, and an alkyl (meth)acrylate-acrylic•butadiene rubber-styrene copolymer. In the core•shell-type graft copolymers exemplified above, the "alkyl (meth)acrylate" of the core layer is preferably an acrylic acid substituted with an alkyl group having a carbon number of 1 to 10, such as methyl (meth)acrylate, ethyl (meth)acrylate, butyl (meth)acrylate and hexyl (meth)acrylate.

Such a core•shell-type graft copolymer includes, for example, "Metablen (registered trademark) W-450A" produced by Mitsubishi Rayon Co., Ltd.

One of these elastomers composed of a core•shell structure, such as core•shell-type graft copolymer, may be used alone, or two or more thereof may be used in combination.

The polycarbonate resin composition of the present invention preferably contains the elastomer composed of a core•shell structure in an amount of 0.05 to 50 parts by weight per 100 parts by weight of the polycarbonate resin of the present invention, and the content is more preferably 0.1 parts by weight or more, still more preferably 0.5 parts by weight or more, and is preferably 40 parts by weight or less, more preferably 30 parts by weight or less, still more preferably 25 parts by weight or less.

When the blending amount of the elastomer composed of a core•shell structure is not more than the upper limit above, this is preferred in view of outer appearance or heat resistance of the molded article, and when the blending amount is not less than the lower limit above, it is advantageously easy to enhance the effect of improving the surface impact resistance or the impact resistance.

[Antioxidant]

The polycarbonate resin composition of the present invention preferably further contains an antioxidant. In the case of using an antioxidant, the content thereof is usually from 0.0001 to 1 part by weight, and the content is preferably 0.001 parts by weight or more, more preferably 0.01 part by weight or more, and is usually preferably 1 part by weight or less, more preferably 0.5 parts by weight or less, still more preferably 0.3 parts by weight or less, per 100 parts by weight of the polycarbonate resin.

When the content of the antioxidant is not less than the lower limit above based on the entire polycarbonate resin composition, the effect of preventing coloring during molding tends to be improved. Also, when the content of the antioxidant is not more than the upper limit above based on the entire polycarbonate resin composition, deposits on a metal mold at the injection molding can be prevented from increasing and at the same time, deposits on a roll when forming a film by extrusion molding can be prevented from increasing, making it possible to prevent impairment of the surface appearance of the product.

The antioxidant is preferably at least one member selected from the group consisting of a phenol-based antioxidant, a phosphite-based antioxidant and a sulfur-based antioxidant, more preferably a phenol-based antioxidant and/or a phosphite-based antioxidant.

Examples of the phenol-based antioxidant include pentaerythritol tetrakis(3-mercaptopropionate), pentaerythritol tetrakis(3-laurylthiopropionate), glycerol-3-stearylthiopropionate, triethylerie glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylene-bis(3,5-di-tert-butyl-4-hydroxy-hydrocinnamide), 3,5-di-tert-butyl-4-hydroxy-benzyl phosphonate-diethyl ester, tris(3,5-di-tert-butyl-4- hydroxybenzyl)isocyanurate, tetrakis(2,4-di-tert-butylphenyl)-4,4'-biphenylene diphosphinate, and 3,9-bis{1,1-dimethyl-2-[β-3-tert-butyl-4-hydroxy-5-methylphenyl)propionyloxy]ethyl}-2,4,8,10-tetraoxaspiro(5,5)undecane.

Among these compounds, an aromatic monohydroxy compound substituted one or more alkyl group having a carbon number of 5 or more is preferred. Specifically, octadecyl-3-(3,5-di-tert-butyl-4-hydroxyphenyl)propionate, pentaerythritol-tetrakis{3-(3,5-di-tert-butyl-4-hydroxyphenyl)propionate}, 1,6-hexanediol-bis[3-(3,5-di-tert-butyl-4-hydroxyphenyl)propionate, 1,3,5-trimethyl-2,4,6-tris(3,5-di-tert-butyl-4-hydroxybenzyl)benzene and the like are preferred, and pentaerythritol-tetrakis{3-(3,5-di-tert-butyl-4-hydroxyphenyl)propionate is more preferred.

Examples of the phosphite-based antioxidant include triphenyl phosphite, tris(nonylphenyl)phosphite, tris(2,4-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, and distearyl pentaerythritol diphosphite.

Among these, trisnonylphenyl phosphite, trimethyl phosphate, tris(2,4-di-tert-butylphenyl)phosphite, bis(2,4-di-tert-butylphenyl)pentaerythritol diphosphite and bis(2,6-di-tert-butyl-4-methylphenyl)pentaerythritol diphosphite are preferred, and tris(2,4-di-tert-butylphenyl)phosphite is more preferred.

Examples of the sulfur-based antioxidant include dilauryl-3,3'-thiodipropionic acid ester, ditridecyl-3,3'-thiodipropionic acid ester, dimyristyl-3,3'-thiodipropionic acid ester, distearyl-3,3'-thiodipropionic acid ester, lauryl stearyl-3,3'-thiodipropionic acid ester, pentaerythritol tetrakis(3-laurylthiopropionate), bis[2-methyl-4-(3-laurylthiopropionyloxy)-5-tert-butylphenyl]sulfide, octadecyl disulfide, mercaptobenzimidazole, 2-mercapto-6-methylbenzimidazole, and 1,1'-thiobis(2-naphthol). Among these, pentaerythritol tetrakis(3-laurylthiopropionate) is preferred.

[Releasing Agent]

The polycarbonate resin composition of the present invention preferably contains a releasing agent. The releasing agent is not particularly limited but includes, for example a higher fatty acid and a stearic acid ester. In view of releasability and transparency, the releasing agent is preferably a stearic acid ester.

The stearic acid ester is preferably a partial or complete ester of a substituted or unsubstituted monohydric or polyhydric alcohol having a carbon number of 1 to 20 and a stearic acid. The partial or complete ester of a monohydric or polyhydric alcohol and a stearic acid is preferably, for example, ethylene glycol distearate, monoglyceride stearate, diglyceride stearate, triglyceride stearate, monosorbitate stearate, stearyl stearate, pentaerythritol monostearate, pentaerythritol tetrastearate, propylene glycol monostearate, stearyl stearate, butyl stearate, sorbitan monostearate or 2-ethylhexyl stearate, more preferably monoglyceride stearate, triglyceride stearate, pentaerythritol tetrastearate or stearyl stearate, still more preferably ethylene glycol distearate or monoglyceride stearate.

The higher fatty acid is preferably a substituted or unsubstituted saturated fatty acid having a carbon number of 10 to 30, more preferably a saturated fatty acid having a carbon number of 10 to 30, and examples of such a higher fatty acid include myristic acid, lauric acid, palmitic acid, stearic acid, and behenic acid. A saturated fatty acid having a carbon number of 16 to 18 is still more preferred, and examples of such a saturated fatty acid include palmitic acid and stearic acid, with stearic acid being preferred among others.

One of these releasing agents may be used alone, or two or more thereof may be mixed and used.

In the case of using a releasing agent, the blending amount thereof is usually preferably 0.001 parts by weight or more, more preferably 0.01 parts by weight or more, still more preferably 0.1 parts by weight or more, and is usually preferably 2 parts by weight or less, more preferably 1 part by weight or less, still more preferably 0.5 parts by weight or less, per 100 parts by weight of the polycarbonate resin.

If the content of the releasing agent is excessively large, deposits on the mold during molding may be increased and when molding is performed in a massive scale, a lot of work may be required for maintenance of the mold or an appearance failure may be caused in the molded article obtained. When the content of the releasing agent in the polycarbonate resin composition is not less than the lower limit above, this is advantageous in that release of the molded article from the mold is facilitated at the molding and a molded article is easily obtained.

[Other Resins]

In the polycarbonate resin composition of the present invention, a resin other than the polycarbonate resin (hereinafter, sometimes simply referred to "other resins") may be used for the purpose of more enhancing•adjusting the molding processability or various physical properties. Specific examples of other resins include a polyester-based resin, a polyether, a polyamide, a polyolefin, and a rubbery modifier such as linear random or block copolymer. Incidentally, the "rubbery modifier" as used herein does not encompass the "elastomer" named in the description of the present invention.

In the case of blending other resins, the blending amount thereof is preferably from 1 to 30 wt %, more preferably from 3 to 20 wt %, still more preferably from 5 to 10 wt %, based on the entire polycarbonate resin composition of the present invention.

[Filler]

In the polycarbonate resin composition of the present invention, a filler, an acidic compound, an ultraviolet absorption aid, a bluing agent, a heat stabilizer, a light stabilizer, an antistatic agent and the like may be appropriately blended as long as the object of the present invention is not impaired. However, the below-described components are representative examples which can be used, and the polycarbonate resin composition of the present invention is not precluded from blending of a component other than those described below.

In the polycarbonate resin composition of the present invention, a filler may be blended as long as the object of the present invention is not impaired. The filler which can be blended in the polycarbonate resin composition of the present invention includes, for example, an inorganic filler and an organic filler.

The blending amount of the filler is preferably from 0 to 100 wt % based on the entire polycarbonate resin composition. The blending amount of the filler is more preferably 50 wt % or less, still more preferably 40 wt % or less, yet still more preferably 35 wt % or less. By blending a filler, an effect of stiffening the polycarbonate resin composition is obtained, but if the blending amount is excessively large, the molded article obtained tends to be worsened in the outer appearance.

Examples of the inorganic filler include glass fiber, milled glass fiber, glass flake, glass bead, silica, alumina, titanium oxide, calcium sulfate powder, gypsum, gypsum whisker, barium sulfate, talc, mica and calcium silicate such as wollastonite; and carbon black, graphite, iron powder, copper powder, molybdenum disulfide, silicon carbide, silicon carbide fiber, silicon nitride, silicon nitride fiber, brass fiber, stainless steel fiber, potassium titanate fiber, and a whisker thereof.

Among these, a glass fiber filler, a glass powder filler, a glass flake filler, various whiskers, mica and talc are preferred; glass fiber, glass flake, milled glass fiber, wollastonite, mica and talc are more preferred; and glass fiber and/or talc are still more preferred. Only one of these inorganic fillers may be used, or two or more thereof may be used in combination.

As the glass fiber or milled glass fiber, any glass or milled glass fiber used for thermoplastic resins may be used, but among others, a fiber composed of alkali-free glass (E glass) is preferred. The diameter of the glass fiber is preferably from 6 to 20 µm, more preferably from 9 to 14 µm. If the diameter of the glass fiber is excessively small, the stiffening effect tends to be insufficient, whereas if the diameter is excessively large, this may adversely affect the outer appearance of the molded article obtained.

Preferred glass fibers include a chopped strand obtained by cutting to a length of 1 to 6 mm, and a milled glass fiber obtained by milling for a length of 0.01 to 0.5 mm, which is commercially available. One of these may be used alone, or both may be mixed and used.

In order to enhance the adherence to the polycarbonate resin, the glass fiber may be used after applying a surface treatment, for example, with a silane coupling agent such as aminosilane and epoxysilane, or a convergence treatment with an acrylic resin, a urethane-based resin or the like.

As the glass bead, any glass bead used for thermoplastic resin may be used. Among others, a glass bead composed of an alkali-free glass (E glass) is preferred. The glass bead is preferably a spherical glass bead having a particle diameter of 10 to 50 µm.

The glass flake includes a scaly glass flake. The maximum diameter of the glass flake blended in the polycarbonate resin composition is generally preferably 1,000 µm or less, more preferably from 1 to 500 µm, and the aspect ratio (ratio between maximum diameter and thickness) is usually preferably 5 or more, more preferably 10 or more, still more preferably 30 or more.

The organic filler includes a powder organic filler such as wood powder, bamboo powder, coconut shell flour, cork flour and pulp powder; a balloon-like or spherical organic filler such as crosslinked polyester, polystyrene, styrene•acrylic copolymer and urea resin; and a fibrous organic filler such as carbon fiber, synthetic fiber and natural fiber.

The carbon fiber is not particularly limited and includes, for example, various flame-retardant, carbonaceous or graphitic carbon fibers which are produced through firing by using, as a raw material, an acrylic fiber, a petroleum or carbon-based special pitch, a cellulose fiber, a lignin or the like.

The average aspect ratio (fiber length/fiber diameter) of the carbon fiber is preferably 10 or more, more preferably 50 or more. If the average aspect ratio is excessively small, the electroconductivity, strength and rigidity of the polycarbonate resin composition tend to decrease. The diameter of the carbon fiber is preferably from 3 to 15 µm, and for adjusting the aspect ratio to the range above, any form of chopped strand, roving strand, milled fiber and the like may be used. One carbon fiber may be used, or two or more kinds of carbon fibers may be mixed and used.

In order to increase the affinity for the polycarbonate resin, the carbon fiber may be subjected, for example, to a surface treatment such as epoxy treatment, urethane treatment and oxidation treatment, as long as characteristics of the polycarbonate resin composition of the present invention are not impaired.

[Acidic Compound or Derivative Thereof]

The polycarbonate resin composition of the present invention may further contain an acidic compound or a derivative thereof.

In the case of using an acidic compound or a derivative thereof, the blending amount of the acidic compound or a derivative thereof is preferably from 0.00001 to 0.1 wt %, more preferably from 0.0001 to 0.01 wt %, still more preferably from 0.0002 to 0.001 wt %, based on the entire polycarbonate resin composition.

When the blending amount of the acidic compound or a derivative thereof is not less than the lower limit above, this is advantageous from the standpoint of preventing coloring which may occur at the injection molding due to a prolonged residence time of the polycarbonate resin composition in the injection molding machine, but if the blending amount of the acidic compound or a derivative thereof is too large, hydrolysis resistance of the polycarbonate resin composition may be reduced.

Examples of the acidic compound or a derivative thereof include a Broensted acid such as hydrochloric acid, nitric acid, boric acid, sulfuric acid, sulfurous acid, phosphoric acid, phosphorous acid, hypophosphorous acid, polyphosphoric acid, adipic acid, ascorbic acid, aspartic acid, azelaic acid, adenosine phosphate, benzoic acid, formic acid, valeric acid, citric acid, glycolic acid, glutamic acid, glutaric acid, cinnamic acid, succinic acid, acetic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, benzenesulfinic acid, benzenesulfonic acid, malonic acid and maleic acid, and esters thereof. Among these acidic compounds or derivatives thereof, sulfonic acids or esters thereof are preferred, and p-toluenesulfonic acid, methyl p-toluenesulfonate, and butyl p-toluenesulfonate are more preferred.

Such an acidic compound or a derivative thereof may be added in the production step of the polycarbonate resin composition as a compound for neutralizing the basic transesterification catalyst used in the above-described polycondensation reaction of the polycarbonate resin.

[Ultraviolet Absorber]

In the polycarbonate resin composition of the present invention, an ultraviolet absorber can be blended as long as the object of the present invention is not impaired. The blending amount of the ultraviolet absorber may be appropriately selected according to the kind of the ultraviolet absorber, but the ultraviolet absorber is preferably blended in an amount of 0 to 5 wt % based on the entire polycarbonate resin composition.

Here, the ultraviolet absorber is not particularly limited as long as it is a compound having an ultraviolet absorbing ability. The compound having an ultraviolet absorbing ability includes, for example, an organic compound and an inorganic compound. Of these, an organic compound is preferred, because its affinity for the polycarbonate resin is easily secured to facilitate uniform dispersion.

The molecular weight of the organic compound having an ultraviolet absorbing ability is not particularly limited but is usually preferably 200 or more, more preferably 250 or more, and is usually preferably 600 or less, more preferably 450 or less, still more preferably 400 or less. If the molecular weight is excessively small, reduction in the ultraviolet-resistance performance may be caused in long-term use, whereas if the molecular weight is excessively large, reduction in the transparency of the resin composition may be caused in long-term use.

Preferred examples of the ultraviolet absorber include a benzotriazole-based compound, a benzophenone-based compound, a triazine-based compound, a benzoate-based compound, a phenyl salicylate ester-based compound, a cyanoacrylate-based compound, a malonic acid ester-based compound, and an oxalic anilide compound. Among these, a benzotriazole-based compound, a hydroxybenzophenone-based compound and a malonic acid ester-based compound are more preferred. One of these compounds may be used alone, or two or more thereof may be used in combination.

More specifically, examples of the benzotriazole-based compound include 2-(2'-hydroxy-3'-methyl-5'-hexylphenyl)benzotriazole, 2-(2'-hydroxy-3'-tert-butyl-5'-hexylphenyl)benzotriazole, 2-(2'-hydroxy-3',5'-di-tert-butylphenyl)benzotriazole, 2-(2'-hydroxy-3'-methyl-5'-tert-octylphenyl)benzotriazole, 2-(2'-hydroxy-5'-tert-dodecylphenyl)benzotriazole, 2-(2'-hydroxy-3'-methyl-5'-tert-dodecylphenyl)benzotriazole, 2-(2'-hydroxy-5'-tert-butylphenyl)benzotriazole, and methyl-3-(3-(2H-benzotriazol-2-yl)-5-tert-butyl-4-hydroxyphenyl)propionate.

Examples of the benzophenone-based compound include a hydroxybenzophenone-based compound such as 2,2'-dihydroxybenzophenone, 2,2',4,4'-tetrahydroxybenzophenone and 2-hydroxy-4-octoxybenzophenone.

Examples of the malonic acid ester-based compound include 2-(1-arylalkylidene)malonic acid esters and tetraethyl-2,2'-(1,4-phenylene-dimethylidene)-bismalonate.

Examples of the triazine-based compound include 2-[4-[(2-hydroxy-3-dodecyloxypropyl)oxy]-2-hydroxyphenyl]-4,6-bis(2,4-dimethylphenyl)-1,3,5-triazine, 2,4-bis(2,4-dimethylphenyl)-6-(2-hydroxy-4-isooctyloxyphenyl)-s-triazine, and 2-(4,6-diphenyl-1,3,5-triazin-2-yl)-5-[(hexyl)oxy]-phenol (Tinuvin 1577FF, produced by Ciba-Geigy). Incidentally, in the description of the present invention, the triazine-based compound recited above as the flame retardant is not regarded as an ultraviolet absorber and is classified into a flame retardant.

Examples of the cyanoacrylate-based compound include ethyl-2-cyano-3,3-diphenyl acrylate and 2'-ethylhexyl-2-cyano-3,3-diphenyl acrylate.

Examples of the oxalic anilide-based compound include 2-ethyl-2'-ethoxy-oxalanilide (Sanduvor VSU, produced by Clariant).

[Bluing Agent]

In the polycarbonate resin composition of the present invention, a bluing agent may be blended so as to cancel the yellow tint attributable to the polycarbonate resin or ultraviolet absorber. As for the bluing agent, a bluing agent conventionally employed for polycarbonate resins may be used without any problem. In general, an anthraquinone-based dye is easily available and preferred.

Specific representative examples of the bluing agent include Solvent Violet 13, popular name [CA. No. (Color index No.) 60725], Solvent Violet 31, popular name [CA. No. 68210], Solvent Violet 33, popular name [CA. No. 60725], Solvent Blue 94, popular name [CA. No. 61500], Solvent Violet 36, popular name [CA. No. 68210], Solvent Blue 97, popular name [MACROLEX VIOLET RR, produced by Bayer AG], and Solvent Blue 45, popular name [CA. No. 61110]. One of these bluing agents may be used alone, or two or more thereof may be used in combination.

The bluing agent is usually blended in a ratio of preferably from $0.1 \times 10^{-5}$ to $2 \times 10^{-4}$ wt % based on the entire polycarbonate resin composition.

[Light Stabilizer]

For the purpose of more improving the light resistance of the polycarbonate resin composition and polycarbonate resin molded article of the present invention, a light stabilizer can be blended in the polycarbonate resin composition of the present invention.

Examples of the light stabilizer include bis(2,2,6,6-tetramethyl-4-piperidyl)sebacate, bis-(1,2,2,6,6-pentamethyl-4-piperidyl)sebacate, poly[{6-(1,1,3,3-tetramethylbutyl)amino-1,3,5-triazine-2,4-diyl} {(2,2,6,6-tetramethyl-4-piperidyl)imino}hexamethylene {(2,2,6,6-tetramethyl-4-piperidyl)imino}], an N,N'-bis(3-aminopropyl)ethylenediamine-2,4-bis[N-butyl-N-(1,2,2,6,6-pentamethyl-4-piperidylamino)-6-chloro-1,3,5-triazine condensate, and a polycondensate of dibutylamine•1,3,5-triazine-N,N'-bis(2,2,6,6)-tetramethyl-4-piperidyl-1,6-hexamethylenediamine and N-(2,2,6,6-tetramethyl-4-piperidyl)butylamine. Among these, bis(2,2,6,6-tetramethyl-4-piperidyl)sebacate and bis(1,2,2,6,6-pentamethyl-4-piperidyl)sebacate are preferred.

In the case of using the light stabilizer, the light stabilizer is preferably blended in a ratio of 0 to 2 wt %, more preferably from 0.005 to 0.5 wt %, still more preferably from 0.01 to 0.2 wt %, based on the entire polycarbonate resin composition of the present invention.

By blending such a light stabilizer, the light resistance of the molded article obtained by molding the polycarbonate resin composition of the present invention can be enhanced without causing bleed out to the surface of the polycarbonate resin composition and reduction in the mechanical characteristics of the molded article obtained.

[Other Additives]

In the polycarbonate resin composition of the present invention, an antistatic agent may be further incorporated as long as the object of the present invention is not impaired. Furthermore, in the polycarbonate resin composition of the present invention, as long as the object of the present invention is not impaired, various additives such as heat stabilizer, neutralizer, coloring agent, slip agent, lubricant, plasticizer, compatibilizer and flame retardant may be blended, other than those described above.

[Timing of Adding and Method for Adding Various Additives]

The timing of adding and method for adding the above-described various additives blended in the polycarbonate resin composition, such as antioxidant, release agent, filler or acidic compound or its derivative, ultraviolet absorption aid, bluing agent, heat stabilizer, light stabilizer and antistatic agent, are not particularly limited.

The timing of adding the additives includes: for example, in the case of producing the polycarbonate resin by a transesterification method, when the polymerization reaction is completed; and irrespective of the polymerization method, when the polycarbonate resin or polycarbonate resin composition is in a melted state, such as during melt-kneading of the polycarbonate resin and other compounding agents, or when the polycarbonate resin composition that is in a solid state such as pellet and powder is blended-kneaded using an extruder or the like.

The method for adding additives includes, for example, a method of directly mixing or kneading various components with the polycarbonate resin, and a method of adding a high-concentration master batch prepared using a small amount of the polycarbonate resin composition, other resins or the like and various components.

[Production Process]

The polycarbonate resin composition of the present invention can be produced by mixing raw materials, that is, the polycarbonate resin and the elastomer composed of a core•shell structure of the present invention and furthermore, if desired, other resins or various additives, simultaneously or in an arbitrary order by means of a tumbler, a super-mixer, a floater, a V-blender, a Nauta mixer, a Banbury mixer, an extruder or the like.

[Polycarbonate Resin Molded Article]

The polycarbonate resin composition of the present invention is molded, whereby the polycarbonate resin molded article of the present invention is obtained.

The polycarbonate resin molded article of the present invention can be produced by directly mixing raw materials such as polycarbonate resin, elastomer and, if desired, other resins or additives, charging the mixture into an extruder or an injection molding machine, and molding it, or by melt-mixing the raw materials above by means of a twin-screw extruder, extruding the molten mixture in strand form to produce a pellet, charging the pellet into an extruder or an injection molding machine, and molding it.

The molding method is not particularly limited, and a commonly known method such as injection molding method, extrusion molding method and compression molding method may be employed, but in view of degree of freedom for the molded article shape, an injection molding method is preferred.

The polycarbonate resin molded article obtained by molding the polycarbonate resin composition of the present invention is excellent particularly in the light resistance and impact resistance and therefore, can be suitably used for an application as a smoke film or the like of, for example, an electric•electronic component, an automotive component, a sheet, a bottle, a container, a building material and a glass window. Among others, when the total light transmittance of the polycarbonate resin composition is 55% or less, the light-blocking effect is excellent and therefore, the molded article is useful particularly, for example, for a smoke film application to glass window or the like, and a glass-alternative building material application such as privacy glass for automobiles or the like and windowpane.

Incidentally, the "film" generally indicates a thin flat product in which the thickness is extremely small as compared with the length and width and the maximum thickness is arbitrarily limited, and the "sheet" generally indicates a flat product which is thin by definition of JIS and is small in the thickness for its length and width.

However, the border between the "sheet" and the "film" is not definite and in the present invention, these two terms need not be distinguished. Therefore, in the present invention, even when "film" is referred to, this encompasses "sheet", and even when "sheet" is referred to, this encompasses "film". The same applies to the "smoke film" above.

EXAMPLES

The present invention is described in greater detail below by referring to Examples, but the present invention is not limited to these Examples as long as its purport is observed. In the following Examples, the values of various production conditions or evaluation results have a meaning as a preferred value of the upper or lower limit in the embodiment of the present invention, and the preferred range may be a range defined by a combination of the upper or lower limit value described above and the value in Example or a combination of values in Examples.

In the following, each raw material or additive used in the productions of polycarbonate resin and polycarbonate resin compositions is indicated by the following abbreviation.

<Dihydroxy Compound>

ISB: Isosorbide "POLYSORB" produced by Roquette Freres

CHDM: 1,4-Cyclohexanedimethanol produced by Eastman Ltd.

<Carbonic Acid Diester>

DPC: Diphenyl carbonate produced by Mitsubishi Chemical Corp.

<Elastomer>

Metablen W-450A:

Core•shell-type elastomer "Metablen (registered trademark) W-450A" produced by Mitsubishi Rayon Co., Ltd. (an elastomer of a core•shell-type graft copolymer where the core layer is an alkyl acrylate polymer and the shell layer is a methyl methacrylate)

Metablen C-223A:

Core•shell-type elastomer "Metablen (registered trademark) C-223A" produced by Mitsubishi Rayon Co., Ltd. (an elastomer of a core•shell-type graft copolymer where the core layer is a butadiene-styrene copolymer and the shell layer is a methyl methacrylate polymer) Paraloid EXL2603:

Core•shell-type elastomer "Paraloid (registered trademark) EXL2603" produced by Rohm and Haas JAPAN K.K. (an elastomer of a core•shell-type graft copolymer where the core layer is a butadiene polymer and the shell layer is an alkyl acrylate-alkyl methacrylate copolymer)

Metablen S-2001:

Core•shell-type elastomer "Metablen (registered trademark) S-2001" produced by Mitsubishi Rayon Co., Ltd. (an elastomer of a core•shell-type graft copolymer where the core layer is a silicon•acrylic composite and the shell layer is a methyl methacrylate polymer)

<Antioxidant>

Adekastab 2112:

Phosphite-based antioxidant "Adekastab (registered trademark) 2112" produced by ADEKA Corporation Adekastab AO-60:

Phenol-based antioxidant "Adekastab (registered trademark) AO-60" produced by ADEKA Corporation <Release Agent>

S-100A:

Stearic monoglyceride produced by Riken Vitamin Co., Ltd.

Also, physical properties of the polycarbonate resin and physical properties of the polycarbonate resin composition were measured and evaluated by the following methods.

[Physical Properties of Polycarbonate Resin]

1) Measurement of Reduced Viscosity

The polycarbonate resin was dissolved using methylene chloride as a solvent to prepare a polycarbonate resin solution having a concentration of 0.6 g/dL, the solution was measured at a temperature of 20.0° C.±0.1° C. by using an Ubbelohde viscosity tube manufactured by Moritomo Rika Kogyo. The relative viscosity $\eta_{rel}$ was obtained from the pass-through time $t_0$ of the solvent and the pass-through time t of the solution according to the following formula (i), and the specific viscosity $\eta_{sp}$ was obtained from the relative viscosity according to the following formula (ii):

$$\eta_{rel} = t/t_0 \tag{i}$$

$$\eta_{sp} = (\eta - \eta_0)/\eta_0 = \eta_{rel} - 1 \tag{ii}$$

The reduced viscosity $\eta_{sp}/c$ was determined by dividing the specific viscosity by the concentration c (g/dL).

A higher value indicates larger molecular weight.

[Physical Properties of Polycarbonate Resin Composition]
<Method for Producing Test Specimen>

A pellet of the polycarbonate resin composition was dried at 80° C. for 6 hours by using a hot-air drier. The dried polycondensation resin composition pellet was then fed to an injection molding machine (Model J75EII, manufactured by The Japan Steel Works, Ltd.), and an injection molded plate (60 mm (width)×60 mm (length)×3 mm (thickness)) and an ISO test specimen for mechanical properties were molded under the conditions of a resin temperature of 240° C., a mold temperature of 60° C. and a molding cycle of 40 seconds.

<Evaluation of Physical Properties>

1) YI Value (1) Before and after Weather Resistance Test
(YI Value Before Weather Resistance Test)

In accordance with JIS K7105 (1981), the yellow index (YI) value of the injection-molded plate (60 mm (width)×60 mm (length)×3 mm (thickness)) obtained above was measured by the illuminant C transmission method using a spectroscopic color difference meter (SE2000, manufactured by Nippon Denshoku Industries Co., Ltd.).

(YI Value after Weather Resistance Test)

In accordance with JIS B7753 (2007), a square surface of the injection molded plate (60 mm (width)×60 mm (length)×3 mm (thickness)) obtained above was subjected to an irradiation treatment for 1,500 hours by using Sunshine Weather Meter S80 manufactured by Suga Test Instruments Co., Ltd. with a Sunshine Carbon Arc (four pairs of ultra-long life carbon arc lamps) illuminant by setting the discharge voltage to 50 V and the discharge current to 60 A in the mode of irradiation and surface spray (rainfall) under the conditions of a black panel temperature of 63° C. and a relative humidity of 50%. The time period of surface spray (rainfall) was set to 12 minutes/hour. The glass filter used was of type A. After the irradiation treatment, the YI value was measured by the same method as that before weather resistance test.

2) YI Value (2) Before and after Weather Resistance Test
(YI Value Before Weather Resistance)

The YI value was measured in the same manner as the YI value before weather resistance test of 1) above.

(YI Value after Weather Resistance)

A square surface of the injection molded plate (60 mm (width)×60 mm (length)×3 mm (thickness)) obtained was subjected to an irradiation test for 100 hours using Metaling Weather Meter M6T manufactured by Suga Test Instruments Co., Ltd. under the conditions of 63° C. and a relative humidity of 50% by installing a horizontal metaling lamp as a light source, quartz as an inner filter, and a #500 filter as an outer filter in the periphery of the lamp and setting the irradiance to become 1.5 kW/m$^2$ at a wavelength of 300 to 400 nm. The YI value after irradiation was measured by the same method as that for the YI Value before weather resistance test above.

3) Notched Charpy Impact Strength

The ISO test specimen for mechanical properties obtained above was subjected to a notched Charpy impact test in accordance with ISO 179 (2000).

4) Total Light Transmittance

In accordance with JIS K7105 (1981), the total light transmittance in the thickness direction of the injection molded plate (60 mm (width)×60 mm (length)×3 mm (thickness)) obtained above was measured with a D65 light source by using a haze meter (NDH2000 manufactured by Nippon Denshoku Industries Co., Ltd.).

Production Example 1

Into a polymerization reaction apparatus equipped with a stirring blade and a reflux condenser controlled to 100° C., ISB, CHDM, DPC adjusted to a chloride ion concentration of 10 ppb or less by distillation purification, and calcium acetate monohydrate were charged to give a molar ratio of ISB/CHDM/DPC/calcium acetate monohydrate=0.50/0.50/1.00/1.3×10$^{-6}$, and thereafter, the apparatus was thoroughly purged with nitrogen (oxygen concentration; from 0.0005 to 0.001 vol %).

Subsequently, the apparatus was heated with a heat medium, and when the internal temperature reached 100° C., stirring was started. The contents were melted while controlling the system to keep the internal temperature at 100° C. and thereby made uniform. Thereafter, heating was started, and the internal temperature was raised to 210° C. over 40 minutes. When the internal temperature reached 210° C., the system was controlled to keep this temperature and at the same time, pressure reduction was started. The pressure was reduced to 13.3 kPa (absolute pressure, hereinafter the same) over 90 minutes after reaching 210° C., and the system was held for further 60 minutes while keeping this pressure.

A phenol vapor generated as a by-product with the progress of polymerization reaction was introduced into the reflux condenser using, as a cooling medium, steam that was controlled to 100° C. in terms of the temperature at the inlet of the reflux condenser. Monomer components contained in a slight amount in the phenol vapor were returned to the polymerization reaction vessel, and uncondensed phenol vapor was subsequently introduced into a condenser using, as a cooling medium, warm water at 45° C. and recovered.

After the pressure was once returned to atmospheric pressure, the thus-oligomerized contents were transferred to another polymerization reaction apparatus equipped with a stirring blade and a reflux condenser controlled in the same manner as above, and heating and pressure reduction were started so as to raise the internal temperature to 220° C. and reduce the pressure to 200 Pa, over 60 minutes.

Thereafter, the internal temperature and the pressure were adjusted to 230° C. and 133 Pa or less, respectively, over 20 minutes, and when a predetermined stirring power was achieved, the pressure was returned to atmospheric pressure. The contents were withdrawn in the form of a strand and then pelletized by a rotary cutter. The reduced viscosity of the obtained pellet was measured and found to be 0.60 dL/g.

Examples 1 and 2 and Comparative Examples 1 to 5

Using the polycarbonate resin pellet produced in Production Example 1, respective components were blended in accordance with the formulation shown in Table-1 and Table-2. The mixture was extruded at a resin temperature of 250° C. by using a twin-screw extruder (TEX30HSS-32) manufactured by The Japan Steel Works, Ltd., and the extrudate was cooled/solidified with water and then pelletized by a rotary cutter, whereby a polycarbonate resin composition was produced. With respect to the obtained polycarbonate resin composition, the YI value before and after weather resistance test and the notched Charpy impact strength were measured and evaluated by the methods described above. The results are shown in Table-1 and Table-2. Incidentally, the YI value before weather resistance test was measured by the method of 1) "YI Value (1) before and after weather resistance test" for Example 1 and Comparative Examples 1 to 4 and measured by the method of 2) "YI Value (2) before and after weather resistance test" for Example 2 and Comparative Example 5.

TABLE 1

| | | | | Example 1 | Comparative Example 1 | Comparative Example 2 | Comparative Example 3 | Comparative Example 4 |
|---|---|---|---|---|---|---|---|---|
| Formulation of Polycarbonate Resin Composition | Polycarbonate resin | Production Example 1 (ISB/CHDM = 50/50) | parts by weight | 100 | 100 | 100 | 100 | 100 |
| | Elastomer | Metablen W-450A | parts by weight | 5.29 | — | — | — | — |
| | | Metablen C-223A | parts by weight | — | — | 5.29 | — | — |
| | | Paraloid EXL2603 | parts by weight | — | — | — | 5.29 | — |
| | | Metablen S-2001 | parts by weight | — | — | — | — | 5.29 |
| | Antioxidant | Adekastab AS2112 | parts by weight | 0.05 | 0.05 | 0.05 | 0.05 | 0.05 |
| | | Adekastab AO-60 | parts by weight | 0.11 | 0.10 | 0.11 | 0.11 | 0.11 |
| | Release agent | S-100A | parts by weight | 0.32 | 0.30 | 0.32 | 0.32 | 0.32 |
| Evaluation Results | Light resistance | YI Value before weather resistance test | — | 85 | 9 | 98 | 33 | 110 |
| | | YI Value after weather resistance test | — | 78 | 6 | 108 | 45 | 95 |
| | | Amount of YI value change | | 7 | 3 | 10 | 12 | 15 |
| | | | pass/fail | passed | passed | failed | failed | failed |
| | Impact resistance | Notched Charpy impact strength | % | 26 | 11 | 131 | 29 | 25 |
| | | | pass/fail | passed | failed | passed | passed | passed |
| | Light-blocking effect | Total light transmittance | % | 53 | 90 | 72 | 83 | 47 |
| | | | pass/fail | passed | failed | failed | failed | passed |

*1: In the Table, "—" indicates that the material was not used.
*2: The light resistance was judged as "passed" when the absolute value of the amount of YI value change was less than 10.
*3: The impact resistance was judged as "passed" when the value of the notched Charpy impact strength became larger than in Comparative Example 1.
*4: The light-blocking effect was judged as "passed" when the total light transmittance was 55% or less.

TABLE 2

| | | | | Example 2 | Comparative Example 5 |
|---|---|---|---|---|---|
| Formulation of Polycarbonate Resin Composition | Polycarbonate resin | Production Example 1 (ISB/CHDM = 50/50) | parts by weight | 100 | 100 |
| | Elastomer | Metablen W-450A | parts by weight | 11.11 | — |
| | | Metablen C-223A | parts by weight | — | — |
| | | Paraloid EXL2603 | parts by weight | — | — |
| | | Metablen S-2001 | parts by weight | — | 11.11 |
| | Antioxidant | Adekastab AS2112 | parts by weight | 0.05 | 0.05 |
| | | Adekastab AO-60 | parts by weight | 0.11 | 0.11 |
| | Release agent | S-100A | parts by weight | 0.32 | 0.32 |
| Evaluation Results | Light resistance | YI Value before weather resistance test | — | 112 | 113 |
| | | YI Value after weather resistance test | — | 105 | 90 |
| | | Amount of YI value change | | 7 | 23 |
| | | | pass/fail | passed | failed |
| | Impact resistance | Notched Charpy impact strength | % | 68 | 72 |
| | | | pass/fail | passed | passed |
| | Light-blocking effect | Total light transmittance | % | 37 | 30 |
| | | | pass/fail | passed | passed |

*1: In the Table the blank column indicates that the material was not used.
*2: The light resistance was judged as "passed" when the absolute value of the amount of YI value change was less than 10.
*3: The impact resistance was judged as "passed" when the value of the notched Charpy impact strength became larger than in Comparative Example 1.
*4: The light-blocking effect was judged as "passed" when the total light transmittance was 55% or less.

As seen from Tables 1 and 2, in both evaluations of weather resistance and impact resistance, judgment was "passed" only in Examples 1 and 2. From these results, it is understood that according to the polycarbonate resin composition of the present invention, a polycarbonate resin composition enhanced in the impact resistance while maintaining the weather resistance and a molded article thereof are obtained.

Furthermore, as seen in Tables-1 and 2, a composition excellent in the light-blocking effect while having high impact resistance is obtained in Examples 1 and 2 and therefore, it is understood that the composition is suitable particularly for a glass-alternative building material application or an application as smoke film or the like, in the usage requiring a material having high impact resistance and nevertheless, being low in the total light transmittance, such as privacy glass for automobiles or the like and smoked glass for window building materials.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2011-079415) filed on Mar. 31, 2011, the entirety of which is incorporated herein by way of reference.

The invention claimed is:

1. A polycarbonate resin composition, comprising:
a polycarbonate resin containing a structural unit derived from a dihydroxy compound having a moiety represented by the following formula (1); and
an elastomer composed of a core•shell structure,
wherein a core layer of the elastomer is at least one member selected from the group consisting of an alkyl (meth) acrylate and a (meth)acrylic acid:

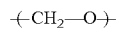 (1)

provided that a case where the moiety represented by formula (1) is a moiety constituting —CH$_2$—O—H is excluded and a glass transition temperature of the polycarbonate resin is less than 145° C.

2. The polycarbonate resin composition according to claim 1, wherein when the polycarbonate resin composition is formed into a molded body of 3 mm in thickness, a total light transmittance is 55% or less.

3. The polycarbonate resin composition according to claim 1, comprising the elastomer in an amount of 0.05 to 50 parts by weight per 100 parts by weight of the polycarbonate resin.

4. The polycarbonate resin composition according to claim 1, wherein the polycarbonate resin contains a structural unit derived from a dihydroxy compound having a cyclic ether structure.

5. The polycarbonate resin composition according to claim 4, wherein the polycarbonate resin contains a structural unit derived from a dihydroxy compound represented by the following formula (2):

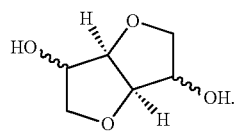 (2)

6. The polycarbonate resin composition according to claim 1, wherein a shell layer of the elastomer is composed of an alkyl (meth)acrylate.

7. The polycarbonate resin composition according to claim 1, wherein the elastomer is at least one core•shell-type graft copolymer selected from the group consisting of an acryl alkylate-methyl methacrylate copolymer, an alkyl (meth)acrylate-alkyl (meth)acrylate copolymer, an alkyl (meth)acrylate-acrylonitrile-butadiene-styrene copolymer, an alkyl (meth)acrylate-acryl rubber copolymer, an alkyl (meth)acrylate-acryl rubber-styrene copolymer, an alkyl (meth)acrylate-acryl•butadiene rubber copolymer and an alkyl (meth)acrylate-acryl•butadiene rubber-styrene copolymer.

8. The polycarbonate resin composition according to claim 1, wherein the polycarbonate resin contains a structural unit derived from an aliphatic dihydroxy compound.

9. The polycarbonate resin composition according to claim 8, wherein the polycarbonate resin contains the structural unit derived from an aliphatic dihydroxy compound in an amount of 20 mol % or more based on structural units derived from all dihydroxy compounds.

10. The polycarbonate resin composition according to claim 1, wherein the polycarbonate resin contains a structural unit derived from at least one dihydroxy compound selected from the group consisting of a dihydroxy compound having a 5-membered ring structure and a dihydroxy compound having a 6-membered ring structure.

11. The polycarbonate resin composition according to claim 1, wherein the polycarbonate resin contains a structural unit derived from at least one dihydroxy compound selected from the group consisting of cyclohexanedimethanols and tricyclodecanedimethanols.

12. A polycarbonate resin molded article, which is obtained by molding the polycarbonate resin composition according to claim 1.

13. The polycarbonate resin molded article according to claim 12, which is obtained by injection-molding the polycarbonate resin composition.

\* \* \* \* \*